United States Patent
Gibson et al.

(10) Patent No.: US 9,487,251 B2
(45) Date of Patent: Nov. 8, 2016

(54) VEHICLE HAVING AN INTEGRATED AIR CURTAIN AND BRAKE COOLING DUCT

(71) Applicant: GM GLOBAL TECHNOLOGY OPERATIONS LLC, Detroit, MI (US)

(72) Inventors: Christopher G. Gibson, Courtice (CA); Emily Symington, Brooklin (CA)

(73) Assignee: GM Global Technology Operations LLC, Detroit, MI (US)

(*) Notice: Subject to any disclaimer, the term of this patent is extended or adjusted under 35 U.S.C. 154(b) by 70 days.

(21) Appl. No.: 14/659,669

(22) Filed: Mar. 17, 2015

(65) Prior Publication Data
US 2016/0272258 A1    Sep. 22, 2016

(51) Int. Cl.
*B62D 35/02* (2006.01)
*F16D 65/847* (2006.01)

(52) U.S. Cl.
CPC ............ *B62D 35/02* (2013.01); *F16D 65/847* (2013.01)

(58) Field of Classification Search
CPC ............................ B62D 35/02; F16D 65/847
USPC ...................................................... 296/180.1
See application file for complete search history.

(56) References Cited

U.S. PATENT DOCUMENTS

| 4,653,788 | A | * | 3/1987 | Di Giusto | B60K 11/08 188/264 A |
| 4,810,021 | A | * | 3/1989 | Burst | B60T 5/00 296/180.1 |
| 5,121,818 | A | * | 6/1992 | McComic | B60T 5/00 136/291 |
| 6,945,576 | B1 | * | 9/2005 | Arentzen | B60K 13/02 180/68.3 |
| 8,474,558 | B2 | * | 7/2013 | Ohira | F02M 35/10013 180/68.3 |
| 8,631,889 | B2 | * | 1/2014 | Begleiter | B60K 11/085 180/68.1 |
| 2013/0233658 | A1 | * | 9/2013 | Carmassi | F16D 65/853 188/264 R |
| 2014/0262644 | A1 | * | 9/2014 | Browne | F16D 65/847 188/264 AA |

* cited by examiner

*Primary Examiner* — Pinel Romain
(74) *Attorney, Agent, or Firm* — Quinn Law Group, PLLC

(57) ABSTRACT

A vehicle includes an air intake opening disposed at a forward end of a body, and a duct, having an air inlet, a first outlet, and a second outlet. The air inlet is disposed adjacent the air intake opening. The first outlet is configured for directing the flow of air across a brake system. The second outlet is configured for directing the flow of air across an exterior surface of a wheel. A shutter is disposed within the duct, and is moveable between a first position and a second position. When disposed in the first position, the airflow control mechanism is configured for directing the flow of air through the first outlet and blocking airflow through the second outlet. When disposed in the second position, the airflow control mechanism is configured for directing the flow of air through the second outlet and blocking airflow through the first outlet.

18 Claims, 2 Drawing Sheets

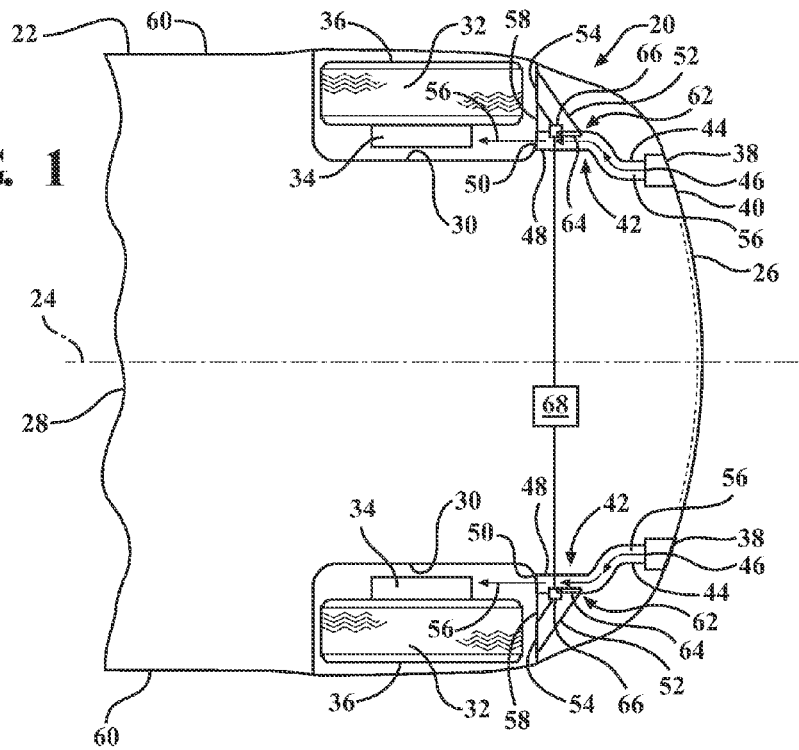
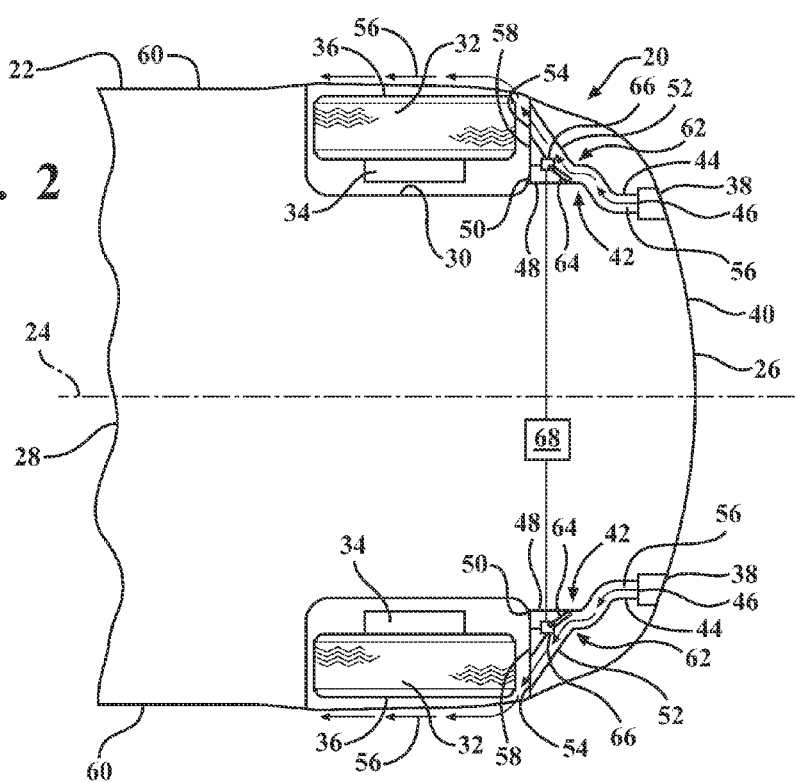

VEHICLE HAVING AN INTEGRATED AIR CURTAIN AND BRAKE COOLING DUCT

TECHNICAL FIELD

The disclosure generally relates to a vehicle.

BACKGROUND

Some vehicles are now being designed to form an air curtain over the front wheels of the vehicle for reducing turbulence, and improving fuel efficiency. In order to form the air curtain, the front fascia of the body is equipped with an opening in the front fascia, located at a lower, front corner of the body. Air ducts route a flow of high pressure air from the opening to an outlet that is disposed at a forward edge of the front wheel well, adjacent the side of the body. The flow of air is discharged at a high speed, and flows across and covers the exterior of the front wheels like a curtain, thereby reducing undesirable aerodynamic turbulence around the rotating wheels.

Some vehicles also include a brake cooling system. The brake cooling system includes an inlet or opening disposed at the forward end of the vehicle, and collects a flow of air which is directed to a brake system, through one or more air ducts, to cool the brake system. Typically, the inlet of the brake duct is in fluid communication with a brake cooling opening in the forward end of the body, often disposed at an outboard lower vertical edge of the forward end of the body. The air flows through the brake cooling opening and through the brake duct continuously when the vehicle is in motion, even when the brake system does not require cooling. This continuous airflow through the brake cooling opening and brake duct introduces a constant aerodynamic drag onto the vehicle, thereby limiting the performance of the vehicle and reducing fuel efficiency of the vehicle.

SUMMARY

A vehicle includes a body that extends along a longitudinal axis. The body defines an air intake opening configured for receiving a flow of air. At least one duct, having an air inlet, is disposed adjacent the air intake opening of the body, and is configured for receiving the flow of air through the air intake opening. The duct further includes a first outlet in fluid communication with the air inlet and configured for directing the flow of air across a brake system, and a second outlet in fluid communication with the air inlet and configured for directing the flow of air across an exterior surface of a wheel to form an air curtain over the wheel. An airflow control mechanism is moveable between a first position and a second position. When disposed in the first position, the airflow control mechanism is configured for directing the flow of air through the first outlet and blocking airflow through the second outlet. When disposed in the second position, the airflow control mechanism is configured for directing the flow of air through the second outlet and blocking airflow through the first outlet.

Accordingly, the vehicle is equipped with a single air intake opening, located in the front of the vehicle, which supplies a flow of air to both the first outlet, i.e., a brake cooling duct outlet, and the second outlet, i.e., an air curtain outlet. The airflow control mechanism controls the flow of air between the two different outlets. This configuration uses the single air intake opening for both functions, thereby minimizing the number of openings in the front fascia of the vehicle, and reducing the packaging requirements of the air ducts between the front of the vehicle and their respective outlets. Additionally, the vehicle may control which one of the duct outlets the air is directed to in order to improve fuel efficiency and/or performance.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic plan view of a vehicle showing an airflow control system in a first position directing a flow of air across a brake system of an associated front wheel.

FIG. 2 is a schematic plan view of the vehicle showing the airflow control system in a second position directing a flow of air across an exterior surface of the front wheel.

DETAILED DESCRIPTION

Figure 3:
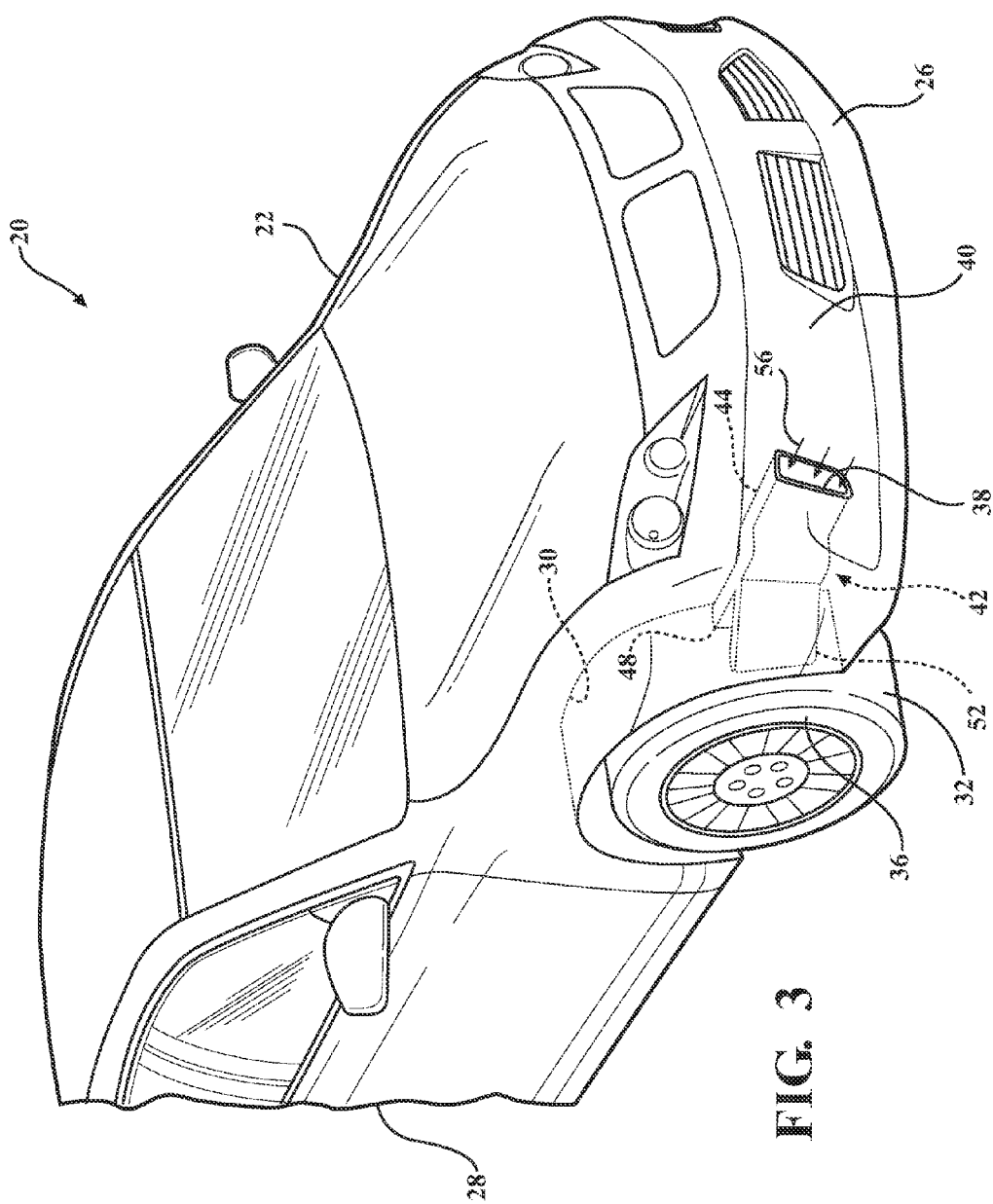
FIG. 3 is a schematic perspective view of a forward end of the vehicle showing an air intake opening in the body.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a vehicle is generally shown at 20. The vehicle 20 may include any type, size and/or style of vehicle, including but not limited to a passenger car, a truck, a van, etc.

Referring to FIGS. 1 and 2, the vehicle 20 includes a body 22 that extends along a longitudinal axis 24. The longitudinal axis 24 extends through a center of the vehicle 20. The body 22 extends along the longitudinal axis 24, between a forward end 26, i.e., a front of the vehicle 20, and a rearward end 28, i.e., a back of the vehicle 20. As described herein, the term "body 22" is used generically, and should be interpreted to include all structural components of the vehicle 20, including a frame, suspension components, exterior panels, etc.

The body 22 defines a forward wheel well 30, which is disposed axially rearward of the forward end 26 the body 22. It should be appreciated that the vehicle 20 may define two forward wheel wells 30, one on opposing lateral sides of the vehicle 20. While the written description below refers to only a single wheel well 30, it should be appreciated that the disclosure may be applied to both forward wheel wells 30. It should also be appreciated that the teachings of the disclosure may be incorporated into the rearward wheel wells 30 of the vehicle 20 as well, although not specifically described herein.

The vehicle 20 includes a wheel 32, and an associated brake system 34, disposed within the wheel well 30. The wheel 32 is rotatably attached to the frame of the vehicle 20, as is known in the art. The brake system 34 is attached to the wheel 32, and is operable to decelerate the wheel 32 as is known in the art. As is known, the wheel 32 is generally tucked within the wheel well 30, such that only an exterior surface 36 of the wheel 32 is exposed. The brake system 34 is generally positioned within an interior of the wheel 32.

Referring to FIG. 3, the body 22 further defines an air intake opening 38 disposed at the forward end 26 of the body 22. Preferably, the air intake opening 38 is an opening that is defined by a front fascia 40 of the body 22, and is preferably disposed adjacent a lower, front corner of the body 22. The forward wheel well 30 is disposed rearward of the air intake opening 38, along the longitudinal axis 24. The air intake opening 38 is configured for collecting and directing a flow of air through to an air control system 42, described in greater detail below.

Referring to FIGS. 1 and 2, the air control system 42 includes at least one air duct and an airflow control mechanism 62. As shown, the at least one air duct includes an inlet duct portion 44 defining an air inlet 46, a first duct outlet portion 48 defining a first outlet 50, and a second duct outlet portion 52 defining a second outlet 54. The air inlet 46 of the inlet duct portion 44 is disposed adjacent the air intake opening 38, and is configured for receiving the flow of air through the air intake opening 38. The flow of air is generally indicated by arrows 56. The inlet duct portion 44 extends rearward toward the wheel well 30. The first duct outlet portion 48 is disposed in fluid communication with the inlet duct portion 44, and conducts the flow of air from the inlet duct portion 44 to the first outlet 50. Accordingly, the first outlet 50 is disposed in fluid communication with the air inlet 46. As shown in FIG. 1, the first outlet 50 is configured for directing the flow of air across the brake system 34 to cool the brake system 34. The second duct outlet portion 52 is disposed in fluid communication with the inlet duct portion 44, and conducts the flow of air from the inlet duct portion 44 to the second outlet 54. Accordingly, the second outlet 54 is disposed in fluid communication with the air inlet 46. As shown in FIG. 2, the second outlet 54 is configured for directing the flow of air across the exterior surface 36 of the wheel 32 to form an air curtain over the wheel 32. Accordingly, it should be appreciated that the single air inlet 46, adjacent the air intake opening 38, provides the flow of air to both the first outlet 50 for cooling the brakes, and/or to the second outlet 54 for creating an air curtain over the front wheel 32.

The second outlet 54, which is configured for creating the air curtain over the front wheel 32, is disposed adjacent a forward edge 58 of the wheel well 30, and adjacent a lateral, exterior side surface 60 of the body 22. The second outlet 54 is sized to generate high speed air flow across the exterior surface 36 of the wheel 32, which covers the exterior surface 36 of the wheel 32 like a curtain, thereby reducing turbulence around the rotating wheel 32, and improving the aerodynamics of the vehicle 20. The first outlet 50 is disposed laterally inboard of the second outlet 54, relative to the longitudinal axis 24, and is positioned to direct the flow of air onto and across the brake system 34, which is disposed nearer the inboard side of the wheel well 30. As used herein, the term inboard is defined as being nearer the central, longitudinal axis 24 of the vehicle 20. Accordingly, the first outlet 50, for cooling the brake system 34, is disposed nearer the longitudinal axis 24 of the vehicle 20 than is the second outlet 54, for forming the air curtain over the exterior surface 36 of the wheel 32.

The vehicle 20 includes an airflow control mechanism 62 operable to control the flow of air through the air ducts 44, 48, 52, from the air inlet 46 and to either of the first outlet 50 and/or the second outlet 54. Preferably, the airflow control mechanism 62 includes a shutter 64 that is disposed within the air ducts 44, 48, 52, at an intersection of the inlet duct portion 44, the first duct outlet portion 48, and the second duct outlet portion 52. However, it should be appreciated that the airflow control mechanism 62 may be configured in some other manner not shown or described herein that is capable of selectively directing the flow of air between the first outlet 50 and the second outlet 54.

The airflow control mechanism 62, and more specifically, the shutter 64, is moveable between at least a first position, shown in FIG. 1, and a second position, shown in FIG. 2. When disposed in the first position, the shutter 64 is configured or positioned within the ducts to direct the flow of air through the first outlet 50, and block airflow through the second outlet 54. As such, when disposed in the first position, the shutter 64 opens fluid communication between the air inlet 46 and the first outlet 50, and closes fluid communication between the air inlet 46 and the second outlet 54. Accordingly, when the shutter 64 is disposed in the first position, the flow of air is directed through the first outlet 50 to cool the brake system 34. When disposed in the second position the shutter 64 is configured or positioned within the ducts to direct the flow of air through the second outlet 54, and block airflow through the first outlet 50. As such, when disposed in the second position, the shutter 64 opens fluid communication between the air inlet 46 and the second outlet 54, and closes fluid communication between the air inlet 46 and the first outlet 50. Accordingly, when the shutter 64 is disposed in the second position, the flow of air is directed through the second outlet 54 to form the air curtain over the exterior surface 36 of the wheel 32.

The airflow control mechanism 62, more specifically the shutter 64, may further be moveable into a third position. The third position may be defined as an intermediate position disposed between the first position and the second position. When positioned in the third position, the shutter 64 is configured or positioned within the ducts to simultaneously direct the flow of air through both the first outlet 50 and the second outlet 54. As such, when disposed in the third position, the shutter 64 simultaneously opens fluid communication between the air inlet 46 and both of the first outlet 50 and the second outlet 54. Accordingly, when the shutter 64 is disposed in the third position, the flow of air is directed through both the first outlet 50 and the second outlet 54 to simultaneously cool the brake system 34 and form the air curtain over the exterior surface 36 of the wheel 32.

The airflow control mechanism 62 further includes an actuator 66 that is coupled to the shutter 64. The actuator 66 is operable to move the shutter 64 between the first position and the second position. The actuator 66 may also be configured to move the shutter 64 into the third position, i.e., an intermediate position between the first position and the second position. The actuator 66 may include, but is not limited to, one of an electronic actuator, a pneumatic actuator, a vacuum actuator, a hydraulic actuator, or some other device capable of moving the shutter 64, or controlling the flow of air from between the air inlet 46, the first outlet 50, and the second outlet 54.

A vehicle controller 68 is operable to control the airflow control mechanism 62, and more specifically the actuator 66. The vehicle controller 68 may include tangible, non-transitory memory on which is recorded computer-executable instructions including an air control module, and a processor configured for executing the air control module. The air control module is configured for determining an optimal position for the shutter 64 for the current operating conditions of the vehicle 20, and signaling the actuator 66 to position the shutter 64 in the optimal position. As such, the air control module determines which position, i.e., the first position, the second position, or the third position, is the optimal position of the shutter 64 given the vehicle's 20 current operating condition, and then signals the actuator 66 to move or position the shutter 64 into the optima position.

The vehicle controller 68 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

When the brake system 34 is engaged to decelerate the vehicle 20, the brake system 34 generates heat. Accordingly, when the vehicle controller 68 determines that the brake system 34 is currently being engaged, then the vehicle controller 68 may signal the actuator 66 to move the shutter 64 into the first position, to direct the flow of air entering the air intake opening 38, through the first outlet 50 for cooling the brake system 34. However, if the vehicle controller 68 determines that the brake system 34 is not currently being engaged, or otherwise does not require cooling, then the vehicle controller 68 may signal the actuator 66 to move the shutter 64 into the second position, to form the air curtain over the front wheel 32, to improve the aerodynamic performance of the body 22. The vehicle controller 68 may make the determination of which position is the optimal position for the current operating conditions of the vehicle 20, based on data sensed contemporaneously, from various sensors of the vehicle 20, such as but not limited to a brake fluid pressure sensor at a brake caliper of each wheel 32, or a vehicle 20 speed sensor.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A vehicle comprising:
a body extending along a longitudinal axis, wherein the body defines an air intake opening configured for receiving a flow of air;
at least one duct having an air inlet disposed adjacent the air intake opening for receiving the flow of air through the air intake opening, a first outlet in fluid communication with the air inlet and configured for directing the flow of air across a brake system, and a second outlet in fluid communication with the air inlet and configured for directing the flow of air across an exterior surface of a wheel to form an air curtain over the wheel; and
an airflow control mechanism moveable between a first position for directing the flow of air through the first outlet and blocking airflow through the second outlet, and a second position for directing the flow of air through the second outlet and blocking airflow through the first outlet.

2. The vehicle set forth in claim 1 wherein the air inlet provides the flow of air to both the first outlet and the second outlet.

3. The vehicle set forth in claim 1 wherein the airflow control mechanism includes a shutter disposed within the at least one duct, wherein the shutter opens fluid communication between the air inlet and the first outlet and closes fluid communication between the air inlet and the second outlet when disposed in the first position, and wherein the shutter opens fluid communication between the air inlet and the second outlet and closes fluid communication between the air inlet and the first outlet when disposed in the second position.

4. The vehicle set forth in claim 3 wherein the airflow control mechanism includes an actuator coupled to the shutter and operable to move the shutter between the first position and the second position.

5. The vehicle set forth in claim 4 wherein the actuator includes one of an electronic actuator, a pneumatic actuator, a vacuum actuator, or a hydraulic actuator.

6. The vehicle set forth in claim 5 wherein the airflow control mechanism includes a vehicle controller having tangible, non-transitory memory on which is recorded computer-executable instructions including an air control module, and a processor configured for executing the air control module, wherein the air control module is configured for determining an optimal position for the shutter for the current operating conditions of the vehicle, and signaling the actuator to position the shutter in the optimal position.

7. The vehicle set forth in claim 3 wherein the at least one duct includes an inlet duct portion, a first duct outlet portion, and a second duct outlet portion, and wherein the shutter is disposed at an intersection of the inlet duct portion, the first duct outlet portion, and the second duct outlet portion.

8. The vehicle set forth in claim 1 wherein the airflow control mechanism is moveable into a third position, wherein the third position is disposed between the first position and the second position, and is configured to simultaneously open fluid communication between the air inlet and both of the first outlet and the second outlet.

9. The vehicle set forth in claim 1 wherein the body defines a wheel well disposed axially rearward of the air intake opening, along the longitudinal axis.

10. The vehicle set forth in claim 9 further comprising a wheel and a brake system disposed within the wheel well.

11. The vehicle set forth in claim 10 wherein the second outlet is disposed adjacent a forward edge of the wheel well, adjacent a lateral, exterior side surface of the body.

12. The vehicle set forth in claim 11 wherein the first outlet is disposed laterally inboard of the second outlet, relative to the longitudinal axis.

13. The vehicle set forth in claim 1 wherein the body extends along the longitudinal axis between a forward end and a rearward end, and the air intake opening is disposed adjacent the forward end of the body.

14. A vehicle comprising:
a body extending along a longitudinal axis, wherein the body defines an air intake opening configured for receiving a flow of air, and a wheel well disposed axially rearward of the air intake opening, along the longitudinal axis;
a wheel and an associated brake system disposed within the wheel well;

at least one duct having an air inlet, a first outlet, and a second outlet;

wherein the air inlet is disposed adjacent the air intake opening for receiving the flow of air through the air intake opening;

wherein the second outlet is positioned adjacent a forward edge of the wheel well, adjacent a lateral, exterior side surface of the body, is disposed in fluid communication with the air inlet, and is configured for directing the flow of air across an exterior surface of the wheel to form an air curtain over the wheel;

wherein the first outlet is disposed laterally inboard of the second outlet, relative to the longitudinal axis, is disposed in fluid communication with the air inlet, and is configured for directing the flow of air across the brake system to cool the brake system;

a shutter disposed within the at least one duct, and moveable between a first position and a second position, wherein the shutter opens fluid communication between the air inlet and the first outlet and closes fluid communication between the air inlet and the second outlet when disposed in the first position, and wherein the shutter opens fluid communication between the air inlet and the second outlet and closes fluid communication between the air inlet and the first outlet when disposed in the second position; and an actuator coupled to the shutter and operable to move the shutter between the first position and the second position.

15. The vehicle set forth in claim 14 wherein the air inlet provides the flow of air to both the first outlet and the second outlet.

16. The vehicle set forth in claim 14 further comprising a vehicle controller having tangible, non-transitory memory on which is recorded computer-executable instructions including an air control module, and a processor configured for executing the air control module, wherein the air control module is configured for determining an optimal position for the shutter for the current operating conditions of the vehicle, and signaling the actuator to position the shutter in the optimal position.

17. The vehicle set forth in claim 14 wherein the at least one duct includes an inlet duct portion, a first duct outlet portion, and a second duct outlet portion, and wherein the shutter is disposed at an intersection of the inlet duct portion, the first duct outlet portion, and the second duct outlet portion.

18. The vehicle set forth in claim 14 wherein the body extends along the longitudinal axis between a forward end and a rearward end, and the air intake opening is disposed adjacent the forward end of the body.

* * * * *